United States Patent [19]

Asano et al.

[11] Patent Number: 4,873,793
[45] Date of Patent: Oct. 17, 1989

[54] NUMERICALLY CONTROLLED MACHINE TOOL

[75] Inventors: Hiroaki Asano, Okazaki; Toshio Tsujiuchi, Kariya; Takao Yoneda, Nagoya; Nobuhiro Ishihara, Aichi; Toshio Maruyama, Kariya; Norio Ohta, Okazaki, all of Japan

[73] Assignee: Toyoda-Koki Kabushiki-Kaisha, Kariya, Japan

[21] Appl. No.: 92,689

[22] Filed: Sep. 3, 1987

[30] Foreign Application Priority Data

Sep. 22, 1986 [JP] Japan ................................. 61-224272
Sep. 22, 1986 [JP] Japan ................................. 61-224273

[51] Int. Cl.$^4$ ............................................. B24B 51/00
[52] U.S. Cl. ............................. 51/165.71; 51/97 NC; 51/105 EC; 364/474.06
[58] Field of Search ......... 51/165 TP, 165.71, 165.75, 51/165.78, 165.77, 165.74, 281 C, 97 MC, 326, 105 EC; 364/474, 474.06

[56] References Cited

U.S. PATENT DOCUMENTS

| | | |
|---|---|---|
| 126,388 | 11/1984 | Nagayama et al. |
| 2,061,554 | 5/1981 | Karlowetz et al. |
| 2,079,003 | 1/1982 | Feller et al. |
| 2,426,534 | 12/1979 | Maecker |
| 3,344,559 | 10/1967 | Inaba et al. ............................ 51/105 |
| 3,482,357 | 12/1969 | Inaba et al. ............................ 51/105 |
| 3,798,430 | 3/1974 | Simon et al. .................... 235/151.11 |
| 3,917,930 | 11/1975 | Davey et al. .................... 235/151.11 |
| 3,964,210 | 6/1976 | Moritomo ...................... 51/165.77 X |
| 4,061,952 | 6/1977 | Dinsdale et al. ...................... 318/572 |
| 4,099,113 | 7/1978 | Hayashi .............................. 318/632 |
| 4,206,393 | 6/1980 | Chiba .................................. 318/632 |
| 4,299,061 | 11/1981 | Parnum et al. .............. 51/165 TP X |
| 4,341,986 | 7/1982 | Browder ............................. 318/618 |
| 4,368,596 | 1/1983 | Wada et al. ....................... 51/165.77 |
| 4,533,991 | 8/1985 | Georgis ................................ 364/164 |
| 4,603,392 | 7/1986 | Chikamoto et al. ......... 51/165.71 X |
| 4,615,149 | 10/1986 | Yoneda et al. ................... 51/165.71 |
| 4,648,025 | 3/1987 | Yoneda et al. .............. 51/165.71 X |

FOREIGN PATENT DOCUMENTS

| | | | |
|---|---|---|---|
| 52-133198 | 11/1977 | Japan .............................. 51/165 TP |
| 52-144895 | 12/1977 | Japan .............................. 51/165 TP |
| 59-194206 | 11/1984 | Japan ................................. 318/618 |
| 59-194207 | 11/1984 | Japan ................................. 318/618 |

Primary Examiner—Robert P. Olszewski
Assistant Examiner—Shirish Deesai
Attorney, Agent, or Firm—Oblon, Spivak, McClelland, Maier & Neustadt

[57] ABSTRACT

A numerically controlled machine tool for machining a non-circular workpiece according to profile data. The servomotor drive unit of the machine tool includes a frequency voltage converter which outputs a velocity compensation signal proportional to the frequency of position command pulses in the servomotor drive units. A position error signal is modulated by the velocity compensation signal. The numerical controller of the machine tool can measure the position error and phase error, and can compensate for these errors. The numerical controller operates according to ideal profile data and measures the actual position change of a tool slide corresponding to the angle position change of a main spindle. Then, the numerical controller calculates the position error and phase error depending on the actual position change and ideal profile data, and produces execution profile data which are compensated for position error. During machining operation, the numerical controller offsets the rear out position of the execution profile data by the calculated phase error so as to eliminate the phase error.

9 Claims, 14 Drawing Sheets

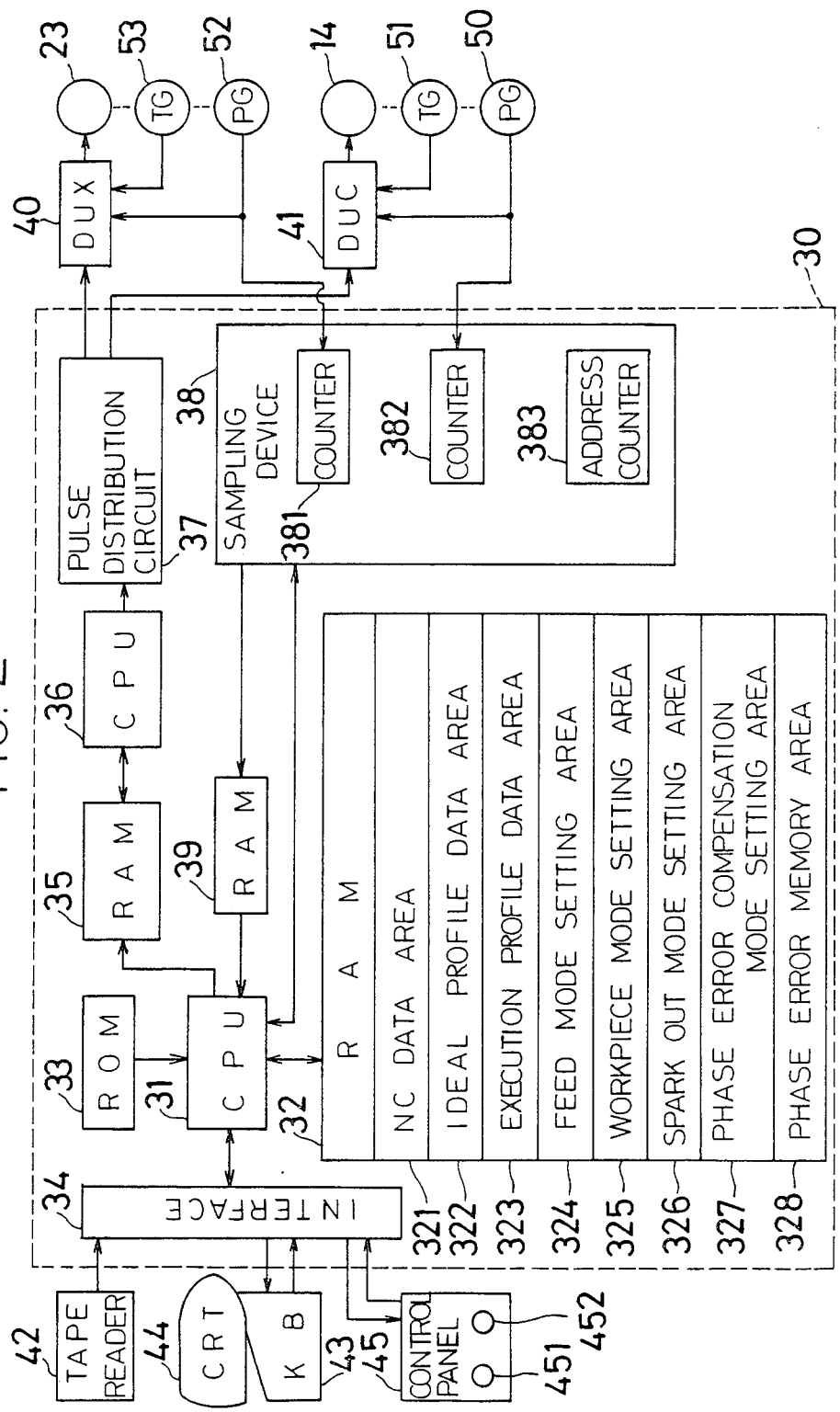

| PROFILE DATA NO. | MAIN SPINDLE ROTATION SPEED | PHASE ERROR |
|---|---|---|
| P 1 2 3 4 | 1 0   rpm | $\Delta\theta_1$ |
| | 2 0 | $\Delta\theta_2$ |
| | 3 0 | $\Delta\theta_3$ |
| P 1 2 3 5 | 1 0 | $\Delta\theta_4$ |
| | 2 0 | $\Delta\theta_5$ |
| | 3 0 | $\Delta\theta_6$ |
| ⋮ | ⋮ | ⋮ |

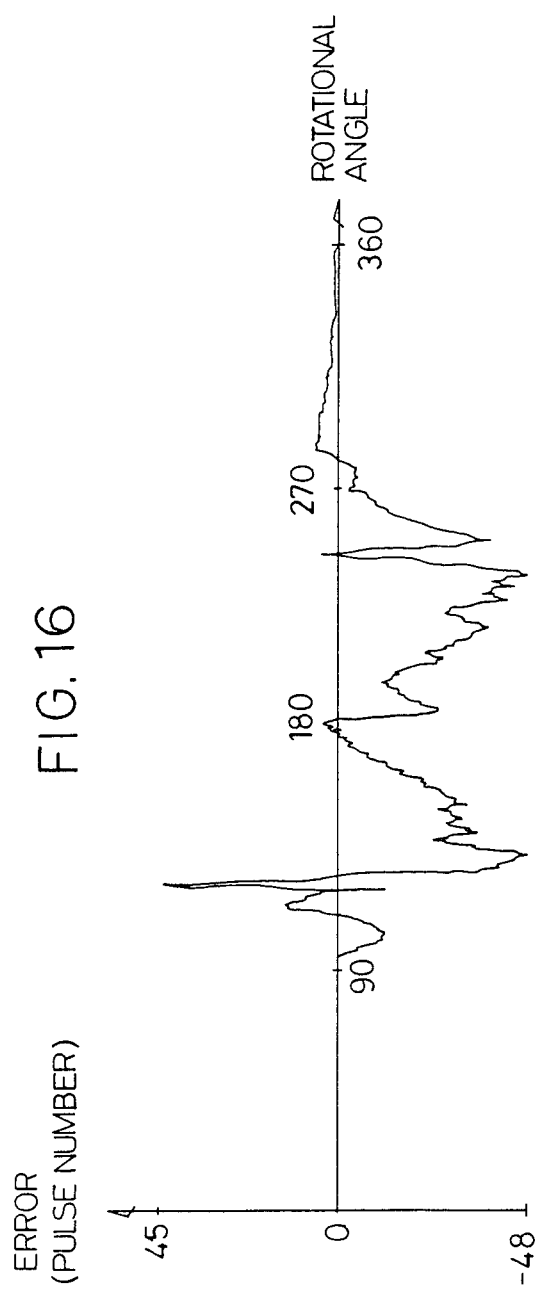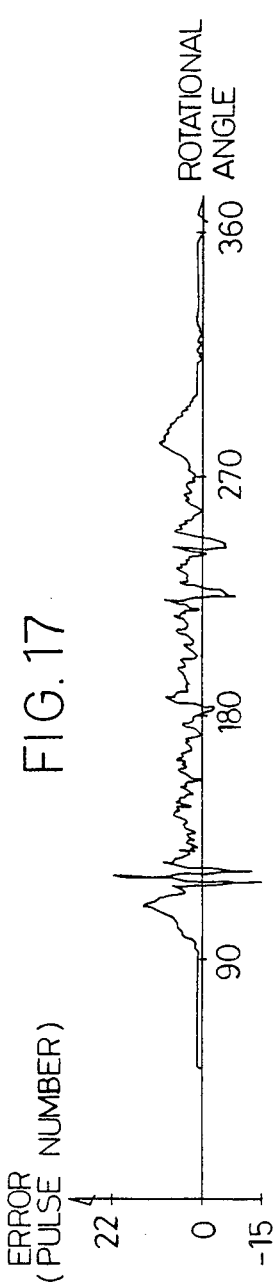

NUMERICALLY CONTROLLED MACHINE TOOL

BACKGROUND OF THE INVENTION

1. Field of the Invention

The present invention relates to a numerically controlled machine tool capable of machining a non-circular workpiece such as a cam shaft.

2. Description of the Prior Art

Generally, in a numerically controlled grinding machine, the feed of the grinding wheel perpendicular to a spindle axis is controlled by a numerical control apparatus according to profile data and machining cycle data.

The profile data comprises the amount of movement of the grinding wheel per unit angle rotation of the spindle which defines the reciprocating motion of the grinding wheel along the finished shape of the workpiece. On the other hand, the machining cycle data comprises a numerical control program to control a machining cycle which includes rapid feed, cutting feed and retracting feed of the grinding wheel.

In the numerically controlled grinding machine tool of the aforementioned type, the ability of the main spindle and the grinding wheel feed axis to accurately follow command data are needed so as to grind the workpiece precisely.

Although increasing the gains of the servo amplifiers is a good method to reduce errors due to following delays, such causes instability in servo control.

On the other hand, a method of compensating the profile data is used to reduce the errors. In this method, a workpiece is ground depending upon ideal profile data which is calculated from the ideal final shape of the workpiece. The final profile of the ground workpiece contains a radial profile error and phase error. After grinding, an operator measures the radial profile error and the phase error with a cam profile measuring device. Then, the operator calculates the execution profile data by compensating the ideal profile data for the radial profile error. At the beginning of grinding the workpiece, the operator shifts the initial angle position of the spindle according to the measured phase error. The amount of follow delay is changed depending on the profiles of the workpieces and the temperature of the servo mechanism, and is changed with the lapse of time. Accordingly, to improve profile accuracy, compensation should be accomplished frequently. Since the above-mentioned measurement and compensation are done manually by an operator, the work efficiency of the operator is poor.

Furthermore, the follow delay of the main spindle is changed depending on the rotational speed of the main spindle. Accordingly, if the speed of the main spindle is changed according to he machining speed, it is difficult to compensate the phase error correctly. Moreover, the follow delay due to the velocity component of profile cannot be compensated completely by the above-mentioned compensation.

SUMMARY OF THE INVENTION

Accordingly, it is a primary object of the present invention to provide an improved numerically controlled machine tool capable of increasing machining accuracy.

Another object of the present invention is to provide an improved numerically controlled machine tool capable of automatically compensating for profile error so as to increase the work efficiency of an operator.

A further object of the present invention is to provide an improved numerically controlled machine tool capable of automatically compensating for phase error.

Briefly, according to the present invention, there is provided a numerically controlled machine tool for grinding a non-circular shaped workpiece such as a cam. The numerically controlled machine tool comprises velocity compensating means for compensating a error signal in a servomotor drive unit. The velocity compensating means compensate in response to a position error signal depending on a commanded angular and/or linear velocity of the workpiece. For example, the compensation signal proportional to the command velocity is produced by a frequency voltage converter which converts the frequency of the command pulses to an analogue signal. By this compensation, the ability to respond regarding the change of commanded velocity is improved. The numerical controlled machine tool further comprises command position signal output means for outputting a command position signal to the servomotor drive unit according to compensated profile data which are calculated from ideal profile data corresponding to the ideal final shape of the workpiece and are compensated for position error due to the follow delay characteristic of the machine tool. By this position error compensation of the profile data and the above-mentioned velocity compensation in the servomotor drive unit, the profile accuracy of the finished workpiece is improved.

According to another aspect of the invention, the numerically controlled machine tool has ideal profile data memory means for storing ideal profile data which are calculated from the ideal final shape of a workpiece, and can operate according to the ideal profile data. The machine tool also has measuring means for measuring position changes of the tool and the main spindle during operation according to the ideal profile data. Then, the ideal profile data is compensated for automatically depending on the ideal profile data and the measured position change. Accordingly, the work efficiency of an operator can be improved.

According to another aspect of the invention, the numerically controlled machine tool has a compensation system for phase error. The numerical controlled machine tool memorizes the ideal profile data, and the machine tool is operated according to the ideal profile data before actual grinding operation. Measuring means detect the instantaneous positions of the main spindle and the tool slide of the machine tool, and produce measured profile data which indicate actual position changes of the tool slide relating to angle position changes of the main spindle. Then, phase error calculation means calculate the phase error by comparing the measured profile data and the ideal profile data. The numerically controlled machine tool further comprises offset means for offsetting the read out point of the profile data ahead by the calculated phase error during machining operation.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, in which:

FIG. 2 is a block diagram showing the structure of the numerical controller 30 shown in FIG. 1;

FIG. 8 shows a numerical control program for measuring errors;

FIG. 9 shows a numerical control program for machining a workpiece;

FIG. 10 shows phase error table which is made in the memory 32 shown in FIG. 2;

FIG. 15 through FIG. 17 show charts which illustrate the measured error.

DETAILED DESCRIPTION OF THE PREFERRED EMBODIMENT

Figure 1:
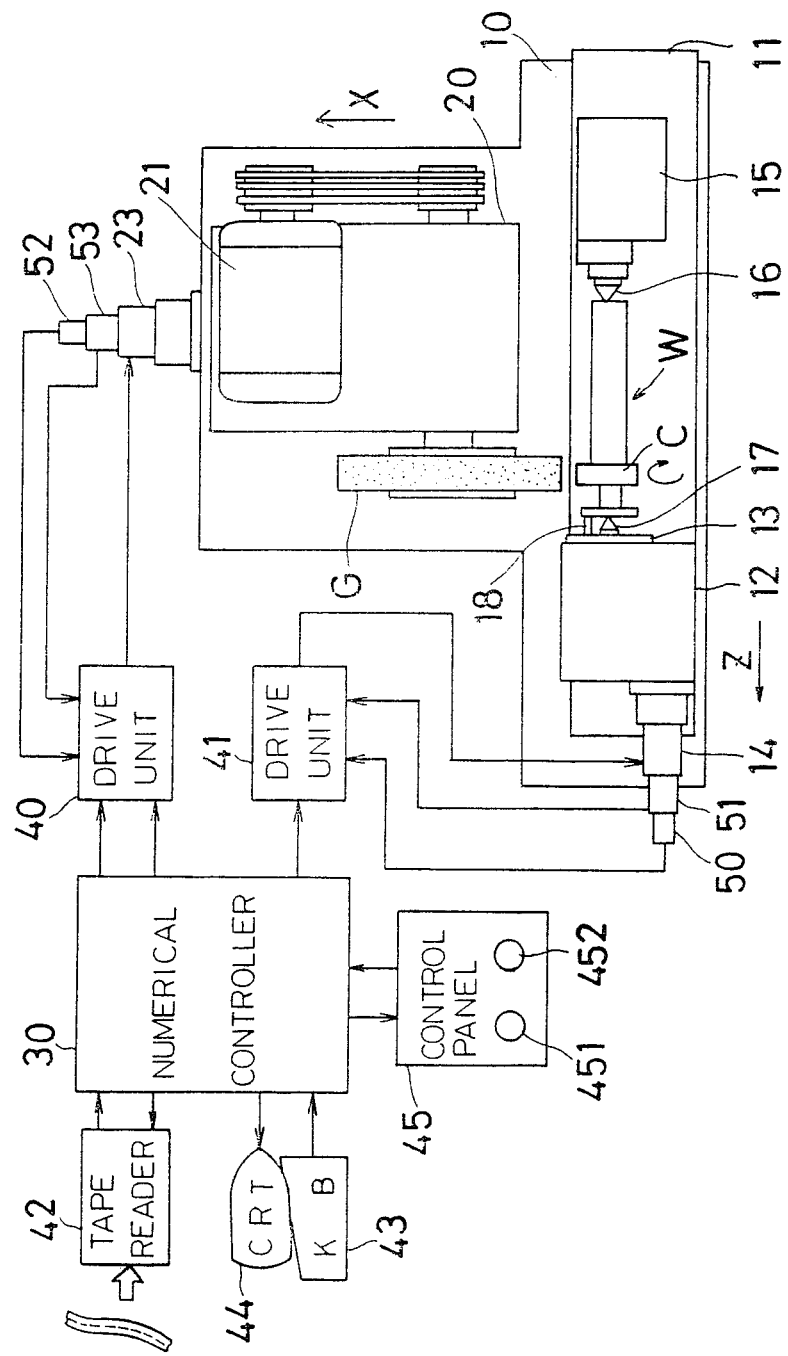
FIG. 1 is a schematic view of a numerically controlled machine tool according to the present invention.

Referring now to the drawings and particularly, to FIG. 1, thereof, a numerically controlled grinding machine is shown comprising a bed 10, on which a table 11 is slidably guided along a Z axis which is parallel to a main spindle 13. A workhead 12 is mounted on the left-hand end of the table 11. The workhead 12 has rotatably carried therein the main spindle 13, which is connected to a servomotor 14 so as to be rotated thereby. A tail stock 15 is also mounted on the right-hand end of the table 11. A workpiece W having cam C is carried between the center 17 of the main spindle 13 and the center 16 of the tail stock 15. The left end of the workpiece is engaged with a positioning pin 18, which is fixed on the main spindle 13, so as to synchronize the phase of the workpiece W with the phase of the main spindle 13.

A tool slide 20 is slidably guided on a rear portion of the bed for movement toward and away from the workpiece W along an X axis. A grinding wheel G, rotatably supported as a tool on the tool slide 20, is rotated by a motor 21. The tool slide 20 is connected to a servomotor 23 through a feed screw (not shown) so that advancing and retraction movement of the tool slide 20 is effected by the servomotor 23.

Figure 13:
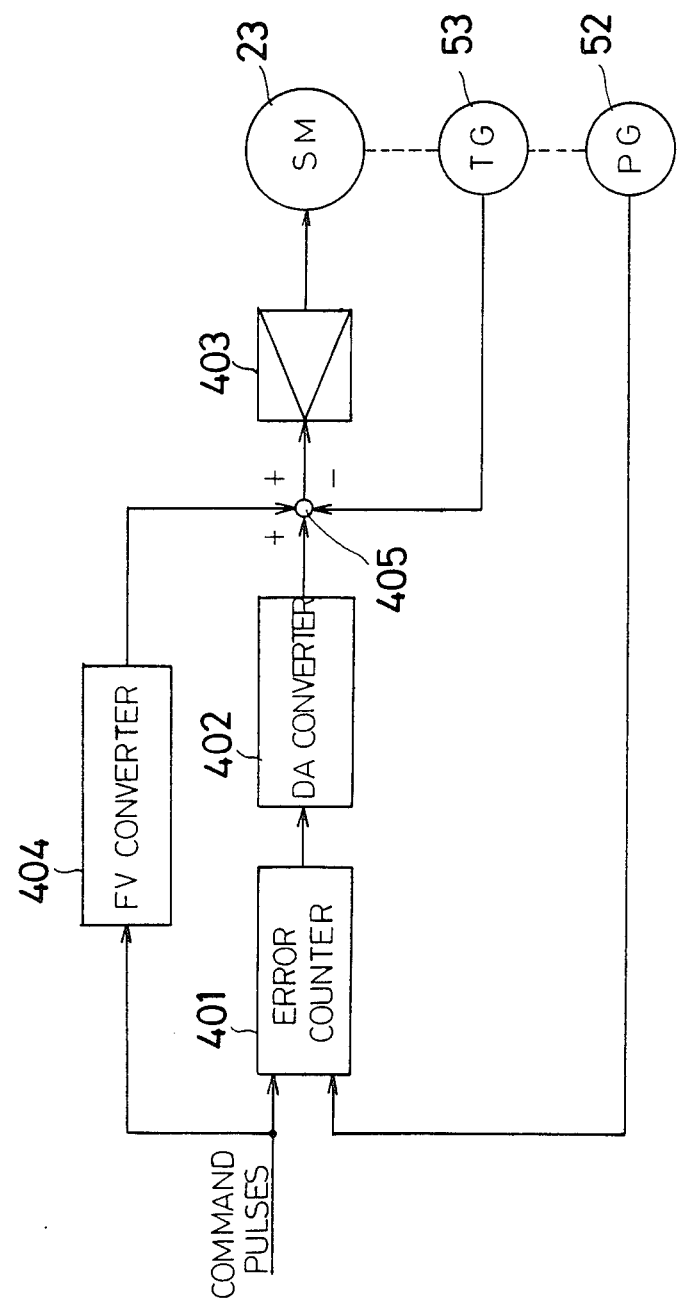
FIG. 13 is a block diagram showing the detailed structure of the drive units 40, 41 shown in FIGS. 1 and 2.

As indicated in FIG. 13, drive units 40, 41 are circuits to drive servomotor 23, 14, respectively, in response to command pulses, which are generated by the numerical controller 30. The drive unit 40 includes an error counter 401, which counts command pulses from the numerical controller 30 and feedback pulses from pulse generator 52 differentially. Digital error data from the error counter 401 are converted to an analogue error signal by a DA converter 42. The error signal of DA counter 402 is led to a subtraction circuit 405, which subtracts a feedback signal generated by a tachogenerator 53 from the error signal. The output signal of the subtraction circuit 405 is led to a amplifier 403, which drives the servomotor 23. Furthermore, a frequency voltage converter 404 (hereafter referred to as a "FV converter"), which outputs a compensation signal according to the frequency of the command pulses, is added. The compensation signal of the FV converter 404 is led to the subtraction circuit 405 so as to increase the output signal from the subtraction circuit 405 according to the level of the compensation signal from the FV converter 404. Since the frequency of the command pulses is in proportion to the velocity component of the profile data, the compensation signal proportional to the velocity component of the profile data is added to the subtraction circuit 405. Accordingly, the follow delay due to the velocity profile component is improved. The circuit of the drive unit 41 is the same as that of the drive unit 40.

The numerical controller 30 controls the rotation of the servomotor 23, 14 numerically so as to grind the workpiece W. A tape reader 42 for inputting ideal profile data and machining cycle data, a keyboard 43 for inputting control data, a CRT display device 44 for displaying various information and a control panel 45 for inputting an operator command are connected to the numerical controller 30.

The numerical controller 30 comprises a main central processing unit (hereafter referred to a "main CPU") 31, a read only memory (ROM) 33, in which control program is stored, a random access memory (RAM) 32 and an interface 34 as shown in FIG. 2. In the RAM 32, there is a NC data area 321 for storing numerical control programs, an ideal profile data area 322 for storing ideal profile data calculated from the ideal final shape of the workpiece, an execution profile data area 323 for storing compensated ideal profile data as execution profile data, and a phase error memory area 328 for storing phase error data in connection with various rotation speeds of the main spindle 13 and ideal profile data numbers. The RAM 32 also has a feed mode setting area 324, a workpiece mode setting area 325, a spark-out mode setting area 326, and a phase error compensation mode setting area 327.

The numerical controller 30 also comprises a drive CPU 36, a RAM 35 and a pulse distribution circuit 37 so as to distribute command pulses to drive units 40, 41. The RAM 35 stores positioning data sent from main CPU 31. The drive CPU 36 executes calculations for slow up, slow down and interpolation depend on the positioning data sent from the main CPU 31 via the RAM 35, and outputs amount of movement data and velocity data at a predetermined interval. The pulse distribution circuit 37 distributes feed command pulses to drive units 40, 41 according to the amount of movement data and velocity data.

The numerical controller includes a sampling device 38 and a RAM 39 as elements of profile measurement means. The sampling device 38 comprises counters 381, 382 which count the feedback pulses generated from pulse generator 52, 50, respectively. These counters 381, 382 are reset when the main CPU 31 outputs a reset signal, and start to count the feedback pulses of the tool feed axis (X axis) and the main spindle (C axis) when the main CPU 31 outputs a measuring start signal. Furthermore, the sampling device 38 comprises an address counter 383, which is reset by the main CPU 31 and is incremented at each sampling. In response to the measuring start signal from main CPU 31, the sampling device 38 reads the count values of counter 381, 382 at predetermined sampling time interval, and stores them in successive memory locations of the RAM 39, the address of which is designated by the address counter 383.

Operation of the numerical controller 30 is described hereinbelow.

Figures 8, 9:
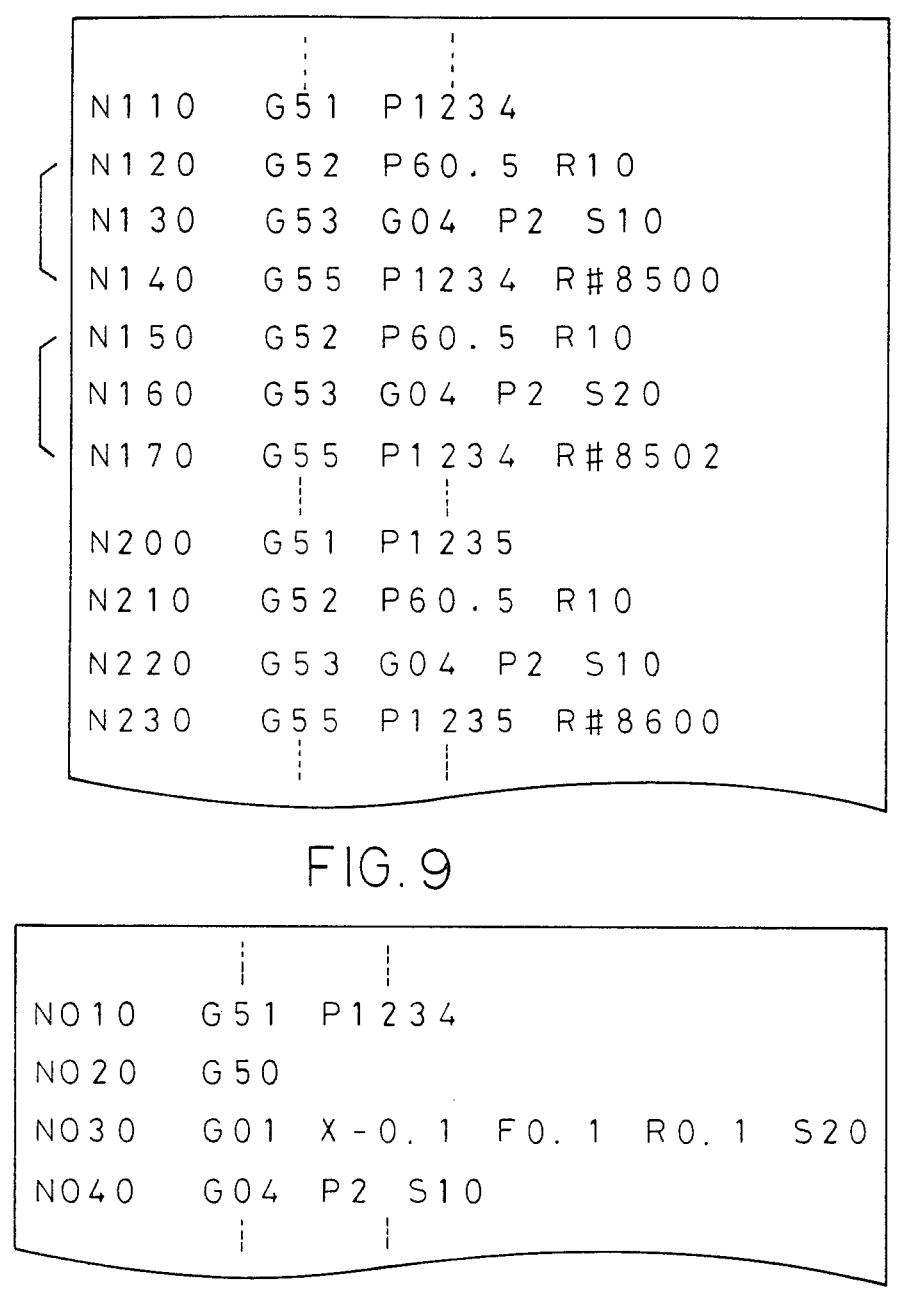

In the RAM 32, an NC program for a phase error measuring cycle shown in FIG. 8 and an NC program for a machining cycle shown in FIG. 9 are stored. When the switch 451 on the control panel 45 is pushed by an operator, the main CPU 31 resets a flag in the phase error compensation mode setting area 327, and executes the NC program for the phase error measuring cycle. On the other hand, when switch 452 is pushed, the main CPU 31 executes the NC program for the machining cycle. These NC programs are decoded by the main CPU 31 according to steps as specified by the flow chart shown in FIGS. 3(a) and 3(b).

One block of an NC program is read out from the NC program area of the RAM 32 at step 100, and it is ascertained whether or not the data of the block shows the end of the program at step 102. If the data shows completion of the NC program, the execution of this program is ended. But if not, the process of main CPU 31 is moved to step 104, and it is ascertained whether or not the block includes code G at step 104. If code G is ascertained at step 104, the process of main CPU 31 is moved to step 106 so as to ascertain the command code in greater detail. In step 106 through step 120, mode flags in the mode setting area 324~327 of the RAM 32 are set, depending on the detail command code. If code G01 is ascertained at step 106, the flag in the feed mode setting area 324 is set at step 108 so as to set a feed mode in a grinding feed mode. Similarly, if code G04 is ascertained at step 110, the flag in the spark out mode setting area 326 is set at step 112 so as to set the feed mode in a spark-out mode. Further, if code G50 is ascertained at step 114, the flag in the phase error compensation mode setting area 327 is set at step 116 so as to set a control mode in a phase error compensation mode. If code G51 is ascertained at step 120, the flag in the workpiece mode setting area 325 is reset to set the workpiece mode in a cam mode.

After the above-mentioned mode setting has occurred, the process of the main CPU 31 is moved to step 122 for certain steps depending on the NC program and mode. If code G52 is ascertained at step 122, a reset signal is sent to the sampling device 38, then, sampling condition data are set in the sampling device. If G53 is ascertained at step 124, the measurement start signal is sent to the sampling device 38 at step 126. If code G55 is ascertained at step 128, the sampled data in the RAM 39 are read at step 130. Then, measured profile data are calculated depending on the sampled data, and error data are calculated based o the difference between the measured profile data and the ideal profile data. After that, execution profile data are produced by compensation calculation.

Furthermore, if code x is ascertained at step 132, the process of the main CPU 31 is moved to step 134, and it is ascertained whether or not the workpiece mode is set in the cam mode and the feed mode is set in the grinding feed mode (hereafter referred to as the cam grinding mode). If the mode is the cam grinding mode, pulse distribution for grinding the cam is executed at step 140. If not, a regular pulse distribution, which is not synchronized with main spindle rotation, is executed at step 136.

(a) Process for Measuring Phase Error

Figure 3A:
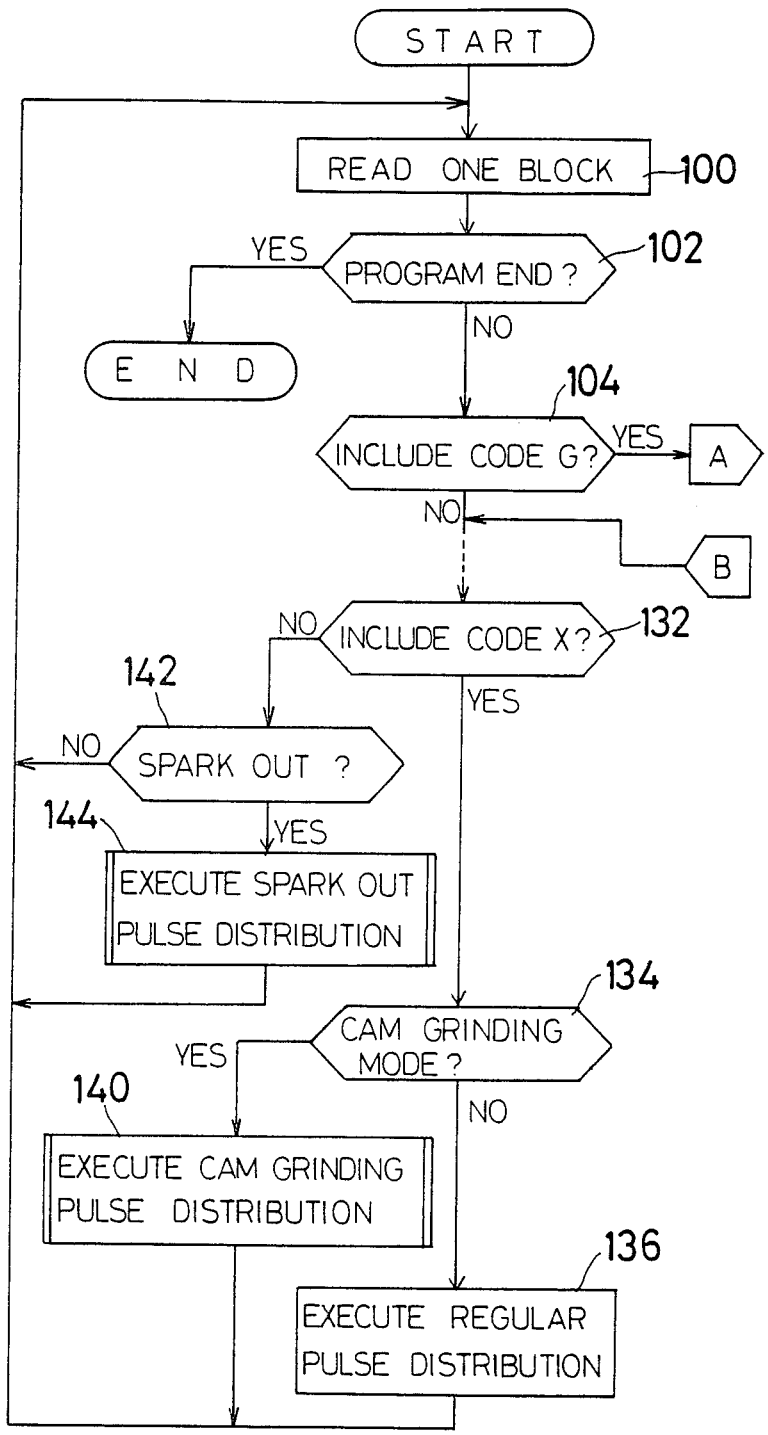
FIGS. 3(a) and 3(b) are flow charts explaining the general operation of the main CPU 31 shown in FIG. 2.
Figure 3B:
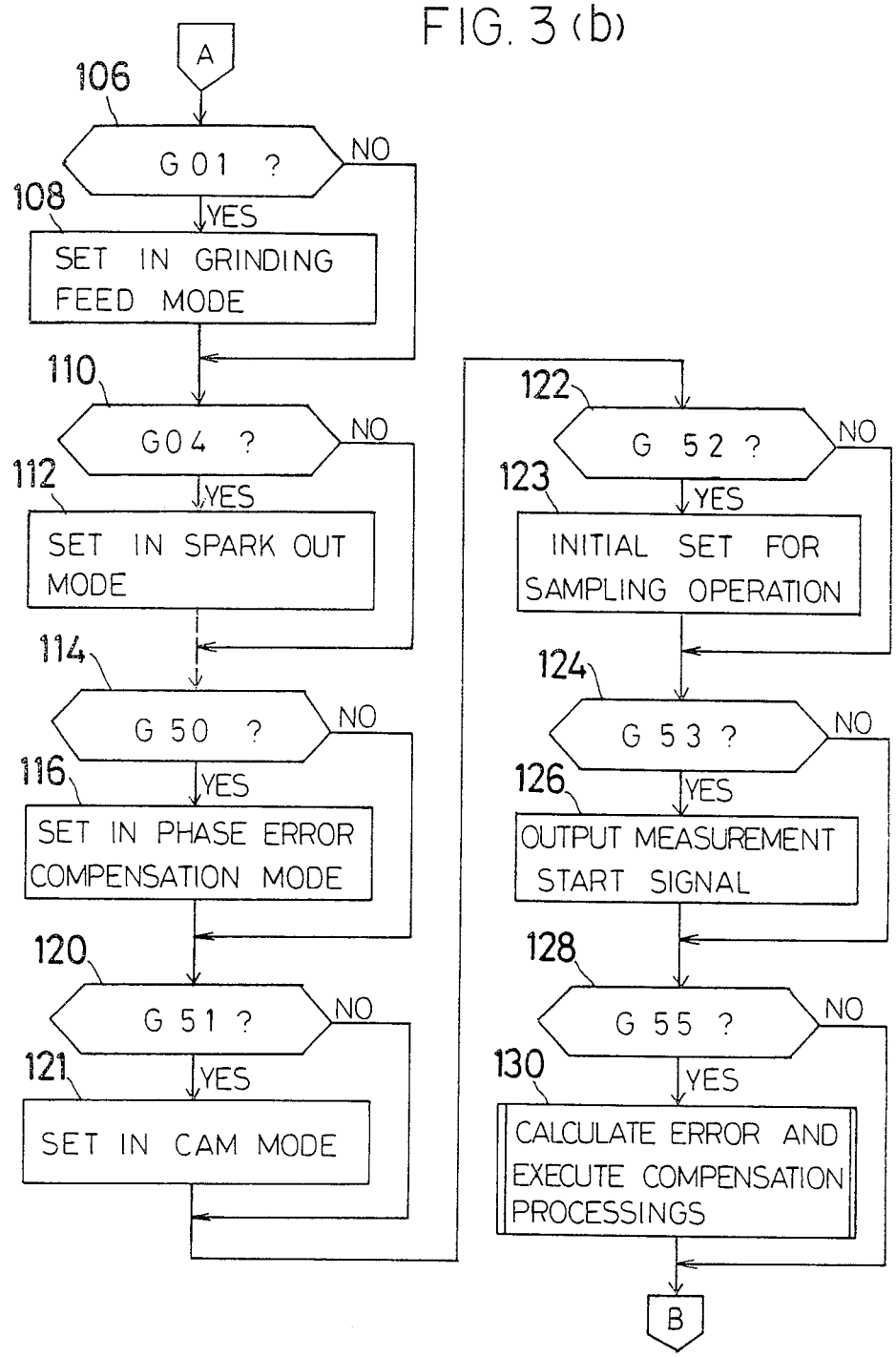

When the switch 451 on the control panel 45 is pushed, the NC program for measuring phase error cycle shown in FIG. 8 is decoded block by block according to the processings shown in FIG. 3(a) and FIG. 3(b). First, in response to code G51 in block N110, the workpiece mode is set in the cam mode, and one set of the ideal profile data designated by profile number P1234 is selected at step 121. In response to code G52 in the next block N120, the initial setting procedure for sampling is accomplished at step 123. Then, a measurement start signal is sent to sampling device 38 in response to code G53 in block N130 at step 126.

Subsequently, in response to code GO4 in block N130, pulse distribution for spark-out motion is executed according to the procedure shown in FIG. 4. Code P2 in block N130 means that the total rotational amount of the main spindle 13 during spark-out is two revolutions, and code S10 means that the rotational speed of the main spindle 13 during spark-out is 10 rpm. The ideal profile data stored in RAM 32 consists of pulse number data which correspond to the feed amount of the tool slide per unit angle (0.5°) of rotation of the main spindle 13, and the read out address of these pulse number data is designated by read out address I.

First, it is ascertained whether or not the mode is in a phase error compensation mode depending on the status of the flag in the phase error compensation mode setting area 327 at step 300. Since the flag is being reset during phase error measurement for indicating that the mode is not in a phase error compensation mode, the process of main CPU 31 is moved to step 302. Then, read out address I and offset address IO are set to 1. The offset address IO is used for phase error compensation, and indicates the read out start address of profile data. Then, it is ascertained whether or not the previous pulse distribution is completed depending on the status of the pulse distribute finish signal sent from the drive CPU 36. If completion of pulse distribution is ascertained, the ideal profile data D(I) is read out at step 306. Then, positioning data is output to the RAM 35 for the drive CPU 36. Then, it is ascertained whether or not read out address I reaches the final address $I_{max}$ of the ideal profile data at step 310. If I is equal to or larger than $I_{max}$, the read out address I is reset to initial value 1 at step 312 so as to return the read out address to the beginning address of ideal profile data area 322. If not, the read out address I is incremented by 1 at step 314. Then, it is ascertained whether or not the read out address I is equal to the offset address IO at step 316. If the read out address I reaches the offset address IO, it means that the main spindle 13 is turned one revolution. Then, the process of main CPU 31 is moved to step 318. At the step 318, it is ascertained whether or not the rotation of the main spindle 13 reaches a programmed value (two revolutions). If it is ascertained that the main spindle 13 rotates two revolutions, the process shown in FIG. 4 is ended. If not, the process of main CPU 31 is moved to step 304, then, the above-mentioned process is repeated again.

Figure 5:
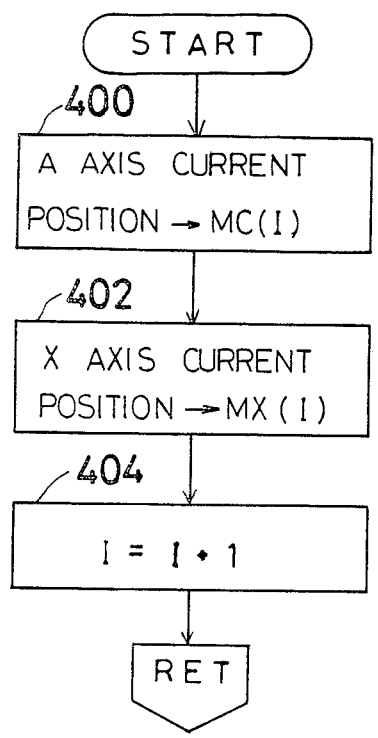
FIG. 5 is a flow chart for explaining the sampling operation of the sampling device shown in FIG. 2.

By the above-mentioned processes, the grinding wheel G is moved according to the ideal profile data without cut-in feed (spark-out cycle) During this spark-out cycle, the sampling device 38 samples the current positions of the main spindle 13 and the tool slide 20, and stores sampled data in RAM 39. Namely, the sampling device 38 executes processings shown in FIG. 5 at a predetermined sampling time interval. At step 400, the contents of counter 382 are stored in memory address MC(I) designated by the count value I of counter 383 of the RAM 39. The contents of counter 381 are also stored in memory address MX(I) designated by the count value I of counter 383. Then, the address counter 383 is incremented by 1 at step 404. The above-mentioned process is repeated at the predetermined sampling interval until the main spindle 13 rotates one revolution so as to sample real positions of the main spindle 13 and the tool slide 20 at the predetermined sampling interval.

Figure 6:
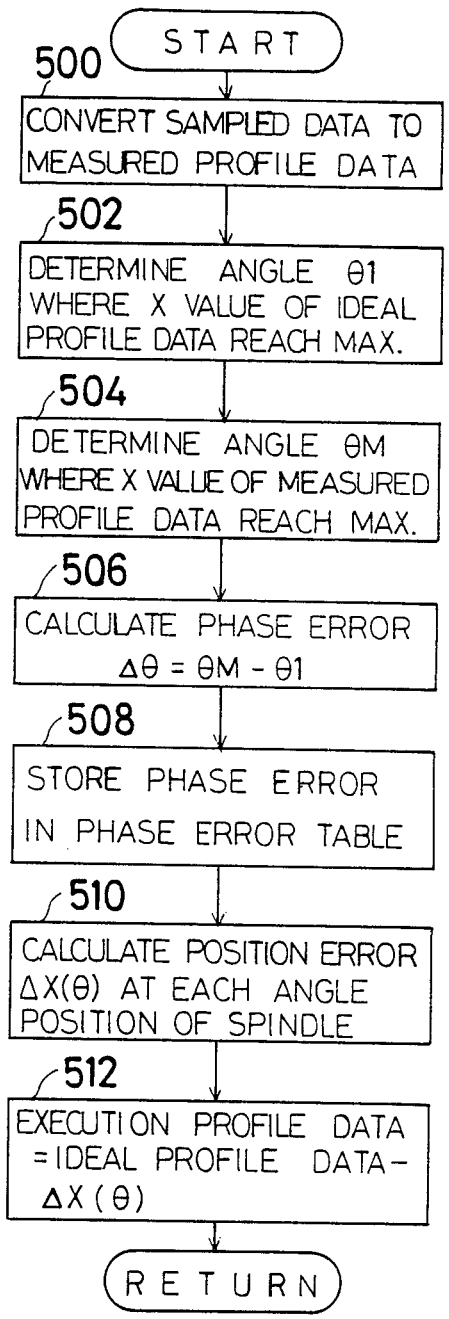
FIG. 6 is a flow chart for illustrating the detail of step 130 shown in FIG. 3(b)
Figure 14A:
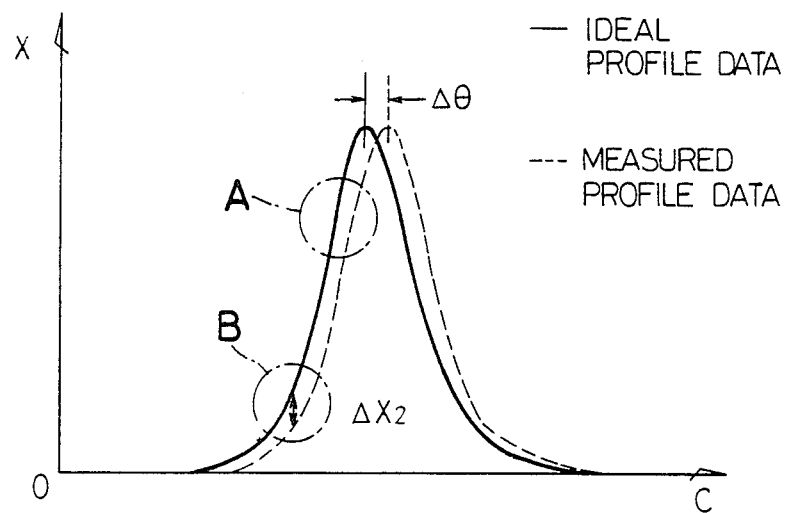
FIGS. 14(a) and 14(b) are explanatory charts for explaining the method of calculating the error of measured profile data, as compared with ideal profile data.
Figure 14B:
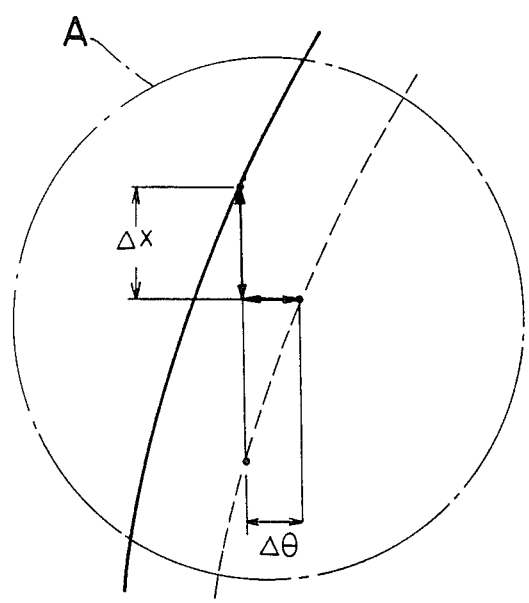

Subsequently, in responding to code G55 in block N140, the error calculation is executed at step 130 in FIG. 3(b). The detailed process at step 130 is shown in FIG. 6. The sampled data of the C axis and X axis indicate position changes at each sampling time shown in FIG. 12. At step 500, the X axis sampled data is converted to X axis position data relating to the angle positions of C axis shown in FIG. 11. First, the time (for example t1, t2, t3, t4), which is in accordance with each angle rotation position (for example C1, C2, C3, C4) of C axis, is calculated by interpolating the sampled data of C axis. Then, the X axis position at each calculated time (for example t1, t2, t3, t4) is calculated by interpolating the sampled data of the X axis. From the result of the above-mentioned calculation, the X axis position data relating to the angle positions of the C axis are determined as measured profile data. Subsequently, the angle position $\theta I$ of the C axis, whereat the X axis position of the ideal profile data reaches a maximum value, is determined by using ideal profile data at step 502, and the angle position $\theta M$ of the C axis, whereat the X axis position of the measured profile data reaches a maximum value, is determined by using measured profile data at step 504. Subsequently, a phase error $\Delta\theta$ is calculated by subtracting $\theta I$ from $\theta M$ at step 506, and the phase error $\Delta\theta$ is stored in a phase error table shown in FIG. 10 which is made in phase error memory area 328 at step 508. At step 510, position errors $\Delta X$ at each unit angle position are calculated depending on the difference between the ideal profile data and the measured profile data. Namely, as shown in FIG. 14(a) and FIG. 14(b), the error between the ideal profile data and the measured profile data consists of phase error $\Delta\theta$ and position error (radial profile error) $\Delta X$. Accordingly, position error $\Delta X$, which is the eliminated effect of phase error $\Delta\theta$, can be calculated by sifting the read out address of the measured profile data ahead by $\Delta\theta$ before calculating the difference between the ideal profile data and the measured profile data. Then, the compensated execution profile data is calculated by subtracting the error $\Delta X(\theta)$ from the ideal profile data at step 512 and the compensated execution profile data are stored in the execution profile data area 323 of RAM 32. During grinding operation, this execution profile data is used.

As mentioned above, the phase error under the condition of the ideal profile data and the rotational speed of the main spindle 13 is measured by block N120 through N140 of NC program. Similarly, other phase errors for different rotational speeds and different ideal profile data are measured by executing a rest part of the NC program, and stored in the phase error table shown in FIG. 10.

(b) Process for Grinding Operation with Phase and Position Error Compensation

When the switch 452 on the control panel 45 is pushed, the NC program for machining cycle shown in FIG. 9 is decoded block by block according to the process shown in FIG. 3(a) and FIG. 3(b). First, in response to code G51 in block N010, the workpiece mode is set in a cam mode, and one set of the ideal profile data designated by profile number P1234 is selected at step 121. In response to code G50 in next block N020, the flag in the phase error compensation mode setting area 327 is set so that the control mode is set in a phase error compensation mode, in which the cam is ground with phase error compensation. Then the feed mode is set in a grinding feed mode in response to the code G01 in block N030 at step 108, and the cam grinding procedure is completed at step 140 in response to feed data X-0.1. Data with code F in block N030 indicates the feed amount per revolution of the main spindle 13, and data with code R indicates the feed speed per revolution of the main spindle 13. Data with code S indicates the rotational speed of the main spindle 13. When data with code F and data with code R are the same value, the grinding wheel G is fed continuously at a constant speed until the total cut-in feed amount reaches a programmed total feed value with code X.

Figure 7:
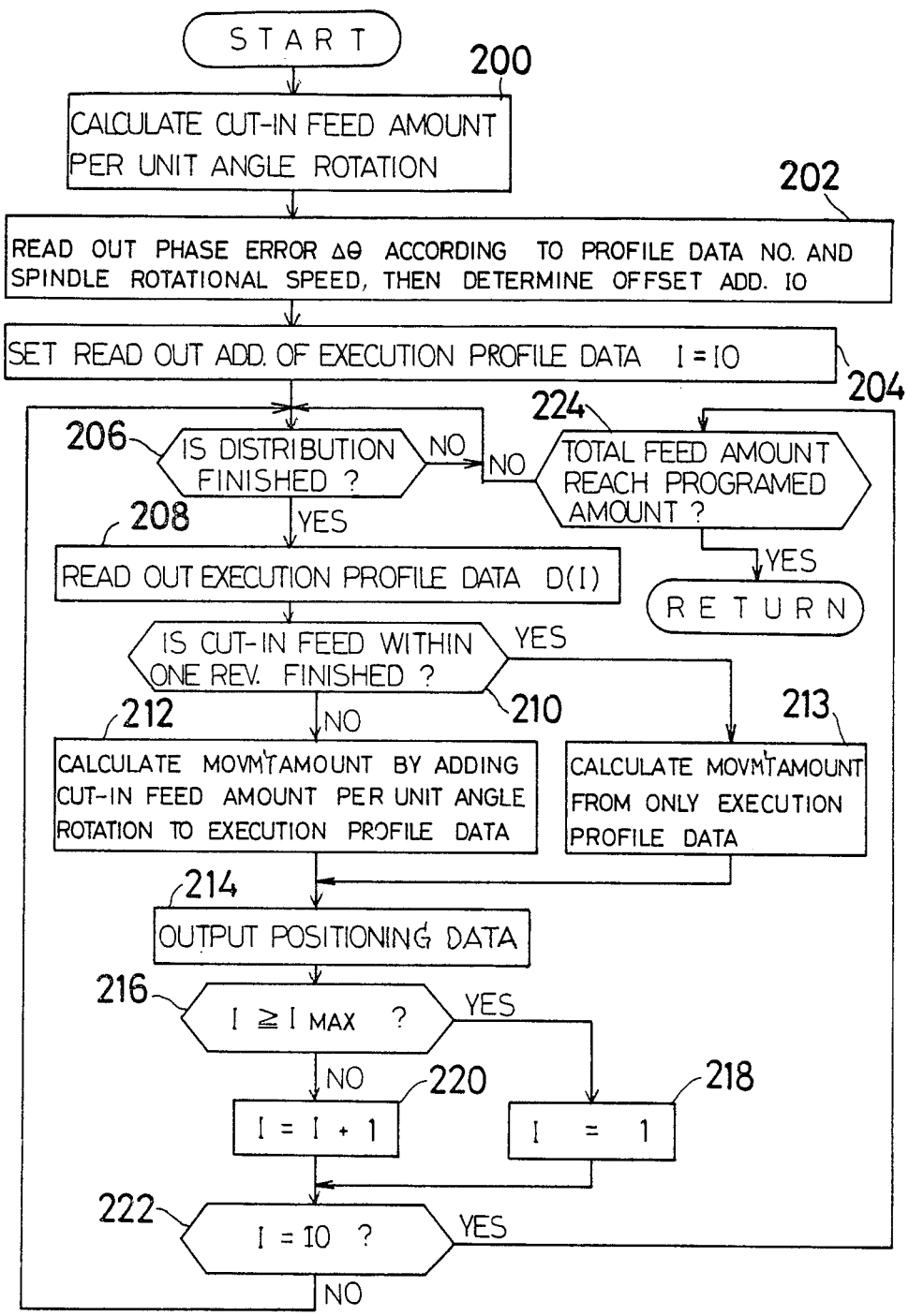
FIG. 7 is a flow chart for illustrating the detail of step 140 shown in FIG. 3(a)

The cam grinding operation with position error compensation and phase error compensation is accomplished by the process at step 140. The details of the process at step 140 are shown in FIG. 7. First, the pulse number corresponding to the cut-in feed amount per unit rotational angle (0.5°) is calculated depending upon the data with code R at step 200. Then, a phase error data $\Delta\theta$ corresponding to the selected execution profile data number and rotational speed is read from the phase error table shown in FIG. 10, and an offset address IO corresponding to the phase error $\neq\theta$ is determined at step 202.

The phase error $\Delta\theta$ can be compensated for by shifting the read out position of the execution profile data ahead from a theoretical read out position, which corresponds to the commanded angle position of the main spindle, to an offset address. Then, the initial value of read out address I is set to offset address IO at step 205. Afterwards, the pulse distribution finish signal is input at step 206 so as to ascertain whether or not the previous pulse distribution is finished. If the previous pulse distribution is finished, the execution profile data D(I) is read out, and then it is ascertained whether or not the cut-in feed within one revolution is finished or completed at step 210. This is ascertained depending on the data with code F. In this case, it is ascertained whether or not the cut-in feed is finished by ascertaining whether or not the feed amount within one revolution reaches 0.1 mm. If the cut-in feed within one revolution is not finished, the amount of movement data is calculated by adding the cut-in amount per unit angle to execution profile data D(I) at step 212. Then, the positioning data is output to the drive CPU 36 at step 214. On the other hand, if the cut-in feed within one revolution is finished, the moving amount is calculated from only the execution profile data D(I) at step 213.

Then, it is ascertained whether or not read out address I reaches the final address $I_{max}$ of the profile data at step 216. If I is equal to or larger than $I_{max}$, the read out address I is reset to an initial value 1 at step 218 so as to return the read out address to the beginning address of the execution profile data area 323. If not, the read out address I is incremented by 1 at step 220. Then, it is ascertained whether or not read out address I reaches the offset address IO so as to detect one revolution of the main spindle 13. If read out address I reaches the offset address IO, it is ascertained whether or not the total cut-in feed amount reaches a programmed total feed amount, which is programmed with code X. If the total cut-in feed amount does not reach the programmed amount, the process moves to step 206 so as to continue the above-mentioned process repeatedly. If the total cut-in feed amount reaches the programmed amount, the process for grinding the cam according to the NC program in block N030 is finished.

Figure 4:
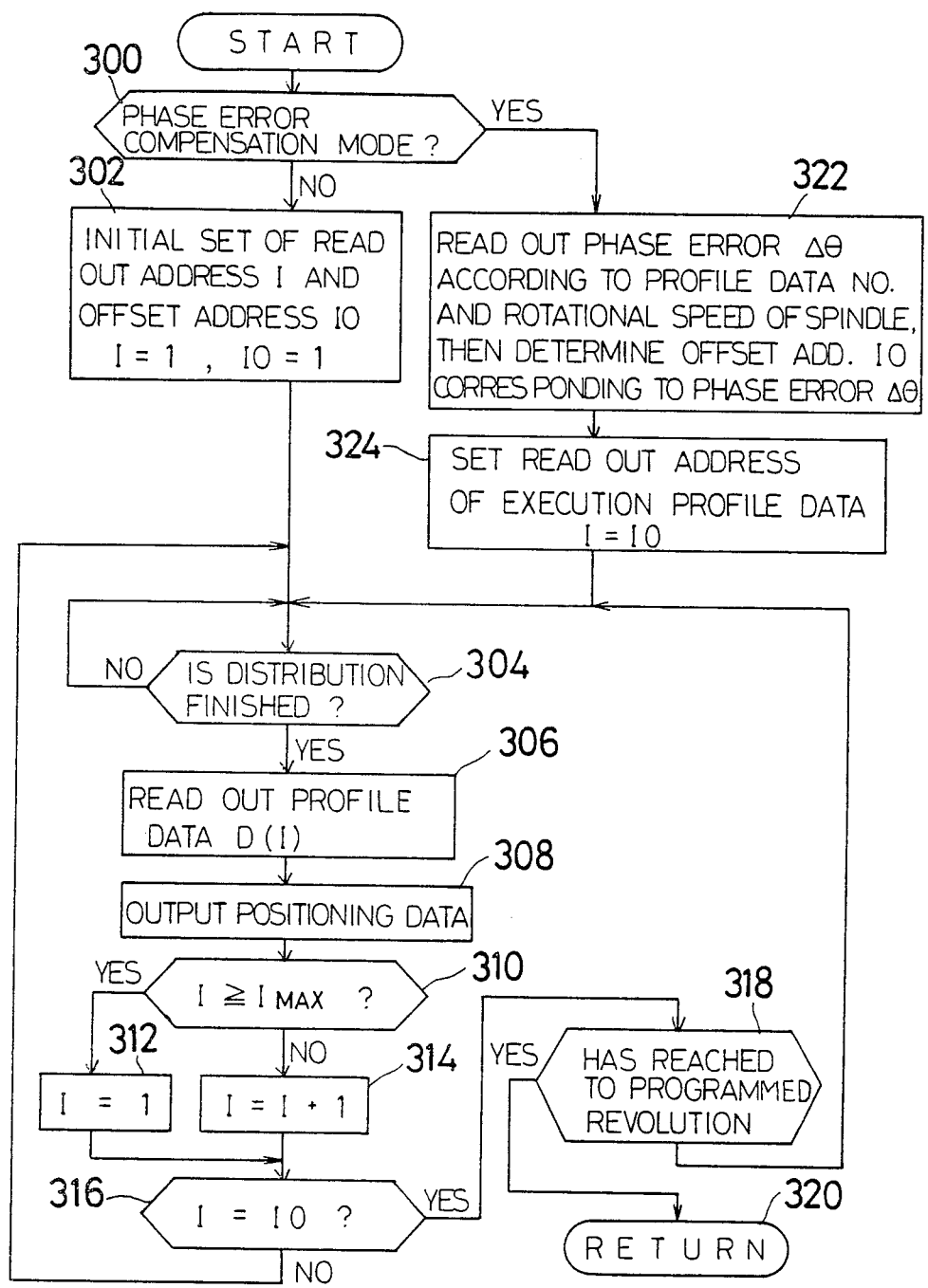
FIG. 4 is a flow chart for illustrating the details of step 144 shown in FIG. 3(a)

Furthermore, the process for spark-out grinding shown in FIG. 4 is executed in response to code G04 in block N040. This process is similar to the process shown in FIG. 7. But, there is no cut-in feed in this process and spark-out grinding is finished when the number of revolutions of the main spindle 13 reaches a programmed value. Namely, since the control mode is set in a phase error compensation mode at this time, the process is moved to step 322 via step 300, then initial setting procedures for phase error compensation similar to those in steps 202, 04 are executed at step 322 and 324. Then, process steps 304 through 318 are executed. These process steps are similar to those in profile error measurement. But, in this situation, execution profile data is used, and initial setting for the read out address I and the offset address IO is different. Namely, the phase error data $\Delta\theta$ corresponding to the execution profile data and the rotational speed of the main spindle is read out from the phase error table, and shifting ahead occurs of the read out position by phase error $\Delta\theta$. By the above-mentioned compensation procedure, spark-out grinding with phase error compensation is accomplished.

As mentioned above, the pulse distribution is executed depending on the execution profile data, which were compensated for position error, and phase error is compensated for by shifting the read out address of the execution profile data at the time of pulse distribution. Accordingly, the cam can be ground without positioning error and phase error.

In the above-mentioned embodiment, sampling device 38 samples current positions of C axis and X axis at predetermined time intervals. But, a sampling device modified as noted below can be used. In this modified sampling device, there is a circuit for outputting a timing signal at every unit angle of rotation of the main spindle depending on the output of counter 382. Then, the instantaneous positions of X axis are sampled when the timing signals are output. In this embodiment, the measured profile data, which consists of X axis instantaneous position data at each unit rotational position of C axis, are produced directly from sampled X instantaneous positions of the X axis without data convertion.

Figure 11:
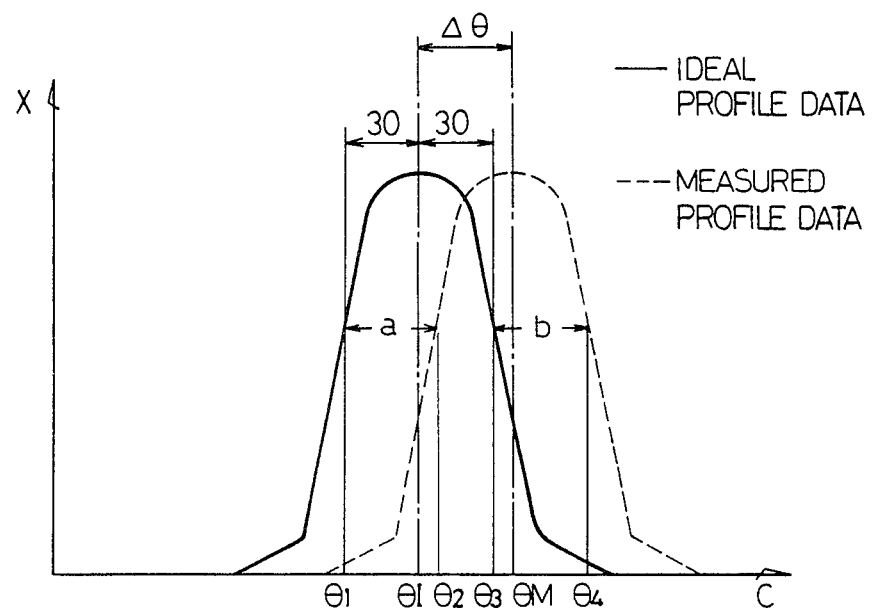
FIG. 11 is an explanatory chart which explains the method of obtaining a phase error.
Figure 12:
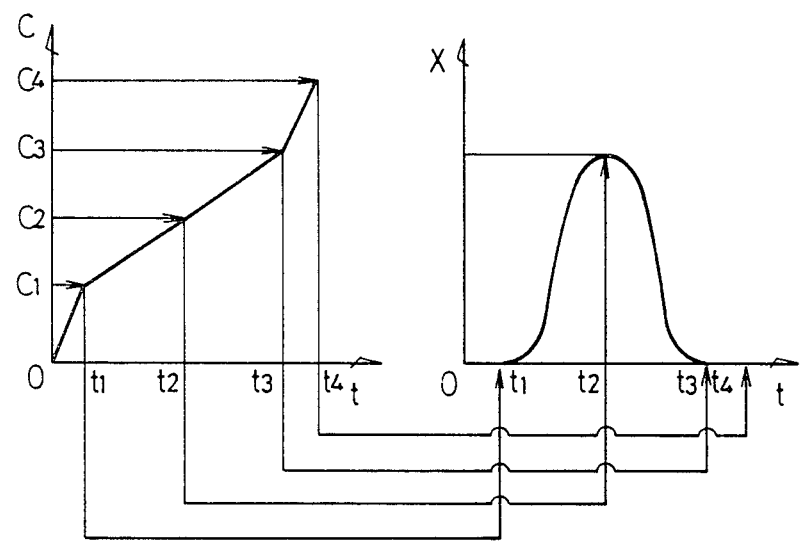
FIG. 12 is an explanatory chart which explains the method of obtaining measured profile data from sampled data.

Although phase error $\Delta\theta$ is calculated from the phase difference between angle positions where X axis current position of ideal profile data and measured profile data reach a maximum value, respectively, the phase error can be determined by another calculation. Namely, as shown in FIG. 11, rotational angles $\theta1$ and $\theta3$, which are shifted in opposite directions from each other by same angle (for example 30 degree) from the angle position $\theta I$ of the ideal profile data, are determined. Then, other rotational angles $\theta2$ and $\theta4$, whereat position of the X axis coincide with those at rotational angles $\theta1$ and $\theta3$ respectively, are determined.

Subsequently, a phase error is calculated by averaging the difference a between rotational angles $\theta1$ and $\theta2$, and the difference b between rotational angles $\theta3$ and $\theta4$.

Furthermore, in the above-mentioned embodiment, the measured error is divided by the phase error and the position error so as to reduce data length of each position error data output, and error compensation is executed depending on both errors. But, such error can be compensated by only position error compensation. Namely, at the error measuring step, the error shown in circle B in FIG. 14(a) is measured as a position error, then the ideal profile data can be compensated for by this measured error. In this case, the phase error compensation is not needed in the grinding operation. On the otherhand, if the positioning error is smaller than the phase error, the error can be compensated by only phase error compensation.

Figure 15:
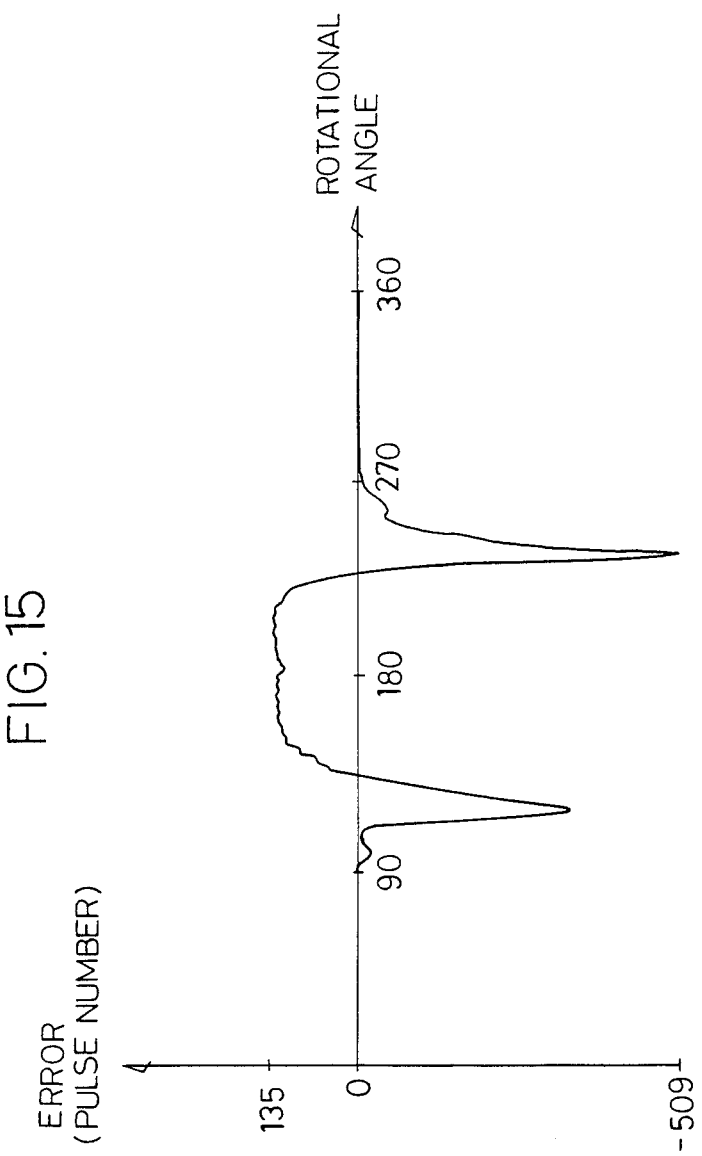

FIG. 15 shows the position error characteristic of a numerically controlled grinding machine which has adopted neither the FV converter 404 shown in FIG. 13 as velocity compensation means nor the above-mentioned position error compensation process, but has adopted only phase error compensation. FIG. 16 shows the position error characteristic of a numerically controlled grinding machine which has adopted FV converter 404 as velocity compensation means and phase error compensation but does not adopt the above-mentioned position error compensation process. FIG. 17 shows the position error characteristic of a numerically controlled grinding machine which has adopted an FV converter 404 as velocity compensation means and the above-mentioned phase and position error compensation process. It is understood from these error characteristics that position error can be eliminated effectively by adopting both velocity compensation means in drive circuits and the error compensation process in a numerical controller.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A numerically controlled machine tool, which has a tool feed axis servomotor, for grinding a non-circular workpiece according to profile data which define a profile generating movement of a tool along the final shape of non-circular workpiece, said numerically controlled machine tool comprising:

a numerical controller for outputting a command position signal according to execution profile data calculated from ideal profile data corresponding to an ideal final shape of said workpiece and compensated for position error due to a follow delay characteristic of said numerically controlled machine tool;

position detecting means for detecting the position of the tool feed axis servomotor, and for outputting a position feedback signal;

a follow error detecting circuit for inputting said command signal position and said position feedback signal, and for detecting a position follow error of said servomotor so as to produce an error signal corresponding to said detected position error;

a velocity compensation signal generating circuit for generating a compensation signal corresponding to a commanded velocity of said servomotor;

an adding circuit for adding said compensation signal to said signal error; and an amplifier for driving said servomotor according to the output signal of said adding circuit.

2. A numerically controlled machine tool as set forth in claim 1, wherein:

said numerical controller outputs command pulses as a command position signal to said follow error detecting circuit; and said velocity compensation signal generating circuit comprises a frequency-voltage converter for producing a compensation signal proportional to the frequency of said command pulses.

3. A numerically controlled machine tool as set forth in claim 1 and which includes a main spindle and a tool slide, further comprising:

ideal profile data memory means for storing ideal profile data calculated from said ideal final shape of said workpiece;

control means for starting profile generating movement of said numerically controlled machine tool according to said ideal profile data;

measuring means for detecting an instantaneous position of said main spindle and said tool slide during said profile generating movement, and producing measured profile data which indicate actual position change of said tool slide corresponding to angle position change of said main spindle error;

calculation means for calculating errors by comparing said measured profile data and said ideal profile data; and data compensating means for producing execution profile data by compensating said ideal profile data for said error calculated by said error calculation means.

4. A numerically controlled machine tool as set forth on claim 3, wherein:

said numerical controller outputs command pulses as a command position signal to said fellow error detecting circuit; and said velocity compensation signal generating circuit comprises a frequency-voltage converter for producing a compensation signal proportional to the frequency of said command pulses.

5. A numerically controlled machine tool for grinding non-circular workpiece by controlling numerically the main spindle rotation and tool feed according to profile data which defines the profile generating movement of a tool along a final shape of said workpiece, said numerically controlled machine tool comprising:

ideal profile data memory means for storing ideal profile data which are calculated from an ideal final shape of said workpiece;

control means for starting profile generating movement of the numerically controlled machine tool according to the ideal profile data;

measuring means for detecting an instantaneous position of a main spindle and a tool slide during the profile generating movement, and for producing measured profile data which indicate actual position change of the tool slide corresponding to angle position changes of the main spindle; and phase error calculation means for calculating phase error by comparing the measured profile data and the ideal profile data;

offset means for offsetting ahead a read out position of said profile data by said calculated phase error from a theoretical read out position of said profile data during actual grinding operation.

6. A numerically controlled machine tool as set forth in claim 5, wherein:

said phase error calculation means comprises phase error memory means for storing plural phase error data relating to different rotational speeds of said main spindle; and said offset means comprises read out means for reading out phase error data corresponding to the rotational speed of said main spindle during grinding operation from said phase error data memory means, and for offsetting ahead the read out position of said profile data by a phase error selectively read out from said phase error memory means.

7. A numerically controlled machine tool as set forth in claim 5, wherein:

said phase error calculation means comprises phase error memory means for storing phase error data relating to different profile data for different profiles; and said offset means comprises read out means for reading out phase error data corresponding to selected profile data during grinding operation from said phase error memory means, and for offsetting ahead the read out position of said profile data by a phase error selectively read out from said phase error memory means.

8. A numerically controlled machine tool as set forth in claim 5, wherein:

said phase error calculation means comprises a phase error memory for storing phase error data relating to plural combinations of rotational speeds of said main spindle and profile data; and said offset means comprises read out means for reading out phase error data corresponding to the rotational speed of said main spindle and selected profile data during grinding operation from said phase error memory means, and for offsetting ahead the read out position of said profile data by a phase error selectively read out from said phase error memory means.

9. A numerically controlled machine tool as set forth in claim 5, further comprising:

position error calculation means for calculating position error data and for eliminating the effect of said phase error; and data compensating means for producing execution profile data by compensating said ideal profile data for said position error calculated by said position error calculation means.

* * * * *